United States Patent [19]

Havermans

[11] Patent Number: 5,450,396
[45] Date of Patent: Sep. 12, 1995

[54] COMMUNICATION SYSTEM AND A PRIVATE BRANCH EXCHANGE TO BE USED IN SUCH A COMMUNICATION SYSTEM

[75] Inventor: Gerardus M. J. Havermans, Hilversum, Netherlands

[73] Assignee: U.S. Philips Corporation, New York, N.Y.

[21] Appl. No.: 138,945

[22] Filed: Oct. 18, 1993

[30] Foreign Application Priority Data

Oct. 19, 1992 [EP]  European Pat. Off. ........... 92203189

[51] Int. Cl.$^6$ ............................................. H04L 12/00
[52] U.S. Cl. ..................................... 370/58.2; 370/79; 370/85.1; 370/110.1
[58] Field of Search ............. 370/53, 58.2, 58.3, 370/68.1, 85.1, 110.1, 79; 379/93, 94, 225, 231, 234

[56] References Cited

U.S. PATENT DOCUMENTS

| | | | |
|---|---|---|---|
| 4,835,769 | 5/1989 | Donaghue, Jr. et al. | 370/110.1 |
| 4,888,766 | 12/1989 | Ogasawara | 370/110.1 |
| 5,008,884 | 4/1991 | Yazawa et al. | 370/110.1 |

OTHER PUBLICATIONS

"Datenkommunikation" D. Conrads, Friedr. Vieweg & Sohn, 1990, pp. 199–219.
"Facilities for Users of Sopho-Set Feature Phones" Philips Telecommunication and Data Systems Review, vol. 48, No. 1, Mar. 1990, pp. 20–27.
"Integrated Services Digital Network" CCITT Recommendation I.440.

Primary Examiner—Hassan Kizou
Attorney, Agent, or Firm—Michael J. Balconi-Lamica; David Schreiber

[57] ABSTRACT

An integrated services communication system ISDN in which a plurality of ISDN supported terminal stations can be coupled to an $S_0$ bus coupled to a private branch exchange, of which a maximum of 2 terminal stations can be active over B-channels. Them is proposed also to connect incompletely ISDN supported terminal stations to the $S_0$ bus, which stations have many non-ISDN supported features, there being investigated on line cards which type of terminal station is connected. On the basis of a Terminal Endpoint Identifier (TEI) in a layer-2 message, either a standard ISDN protocol is handled from layer-2 onwards, or a firm-owned protocol.

4 Claims, 1 Drawing Sheet

COMMUNICATION SYSTEM AND A PRIVATE BRANCH EXCHANGE TO BE USED IN SUCH A COMMUNICATION SYSTEM

BACKGROUND OF THE INVENTION

The invention relates to a communication system based on an integrated services digital network ISDN, comprising a private branch exchange coupled to a public network, the private branch exchange being coupled to a passive bus for connecting ISDN supported terminal stations which communicate with the public network via the private branch exchange, signalling being effected over an ISDN D-channel.

The invention likewise relates to a private branch exchange for a communication system based on an integrated services digital network ISDN, the private branch exchange being coupled to a passive bus for connecting ISDN supported terminal stations which can communicate with a public network via the private branch exchange, signalling being effected over an ISDN D-channel.

A communication system of this type is known from the handbook entitled "Datenkommunikation", D. Conrads, Friedr. Vieweg & Sohn, 1990, pp. 199-219. On page 200 of said handbook a system architecture of an ISDN communication system is shown with an ISDN (Integrated Services Digital Network) as a public network, in which communication from one terminal station to the other is effected via local exchanges, and on page 201 there is described that communication between local exchanges and terminal station may be effected via so-termed 2B+D Basic Rate Access, without framing that is, over 2×64 kbit/sec B-channels and a 16 kbit/sec D-channel, or, as described on page 205, if a private branch exchange is linked to the network via so-termed Primary Rate Access, in Europe 30B+D, or at 2.048 Mbit/sec. In the latter case Basic Rate Access may occur between the private branch exchange and terminal stations coupled to the private branch exchange. In such an ISDN, data or speech communication may be effected via ISDN B-channels through so-termed circuit or packet switched connections between subscribers, whereas the D-channel is used, for example, for signalling purposes. In addition to being connected to an ISDN, ISDN terminal stations can also be connected via network interfaces to a conventional public telephone network, a so-termed PSTN (Public Switched Telephone Network), via a private branch exchange. On page 207 of the handbook, ISDN reference points are indicated for an ISDN private branch exchange connection, the so-termed $S_0$ interface being intended for connecting ISDN supported terminal stations thereto. Customary analog terminal stations are coupled to the $S_0$ interface via what is commonly referred to as a Terminal Adapter. The $S_0$ interface may be coupled to a so-termed U interface or U reference point via a Network Termination, from which reference point a connection to the PABX (Private Automatic Branch Exchange) or ISPBX (Integrated Services Private Branch Exchange) may be realised via an existing two-wire line. In the case of an ISPBX, ISDN supported terminal stations may also communicate with the ISPBX via an $S_0$ interface by means of a four-wire line. This is shown in FIG. 98, on page 207, of said handbook for connecting, for example, a passive bus to the ISPBX. In the case of a PABX, such a passive bus is connected to the PABX by a U interface and a two-wire line. Various ISDN supported terminal stations, a maximum of 8 according to CCITT Recommendations, two terminal stations of which can be active simultaneously via the B-channels, can be connected to the passive bus as this is described on page 204. Page 204 further states that only ISDN supported terminal stations can be connected directly to the $S_0$ bus, and that conventional terminal stations such as X.21 or X.25 stations and the like, are to be connected to the $S_0$ bus via a Terminal Adapter in which digitization and signal adjustment is effected. Such Terminal Adapters are often complicated and relatively expensive. Furthermore, an article in Philips Telecommunication and Data Systems Review, Vol. 48, No. 1, March 1990, pp. 20-27, "Facilities for users of SOPHO-SET feature phones", has disclosed telephone sets which exhibit a great deal of additional features compared to simple telephone sets. These telephone sets, having a display, LED indicators and various function keys, communicate with a digital PABX or private branch exchange over a separate signalling path which enables exchange of messages with the PABX without a telephone call being made. In digital SOPHO-S telephone sets a D-channel in a separate 2B+D two-wire line in the firm-owned set is used for such traffic of messages. A great number of features exhibited by such a telephone set in combination with a private branch exchange, such as featuring informative messages on the display, informative signalling by means of the LED indicators, executive/secretary features such as absence signalling etc. are not supported in ISDN supported terminal stations.

SUMMARY OF THE INVENTION

It is an object of the invention to provide a communication system and a private branch exchange in which no expensive and complicated Terminal Adapters are necessary for connecting terminal stations to an ISDN-$S_0$ interface, and in which firm-owned terminal stations having many non-ISDN supported features may be simply connected to the $S_0$ interface.

A communication system according to the invention is characterized, in that also incompletely ISDN supported terminal stations can be connected to the passive bus, which stations communicate with the public network via the private branch exchange, the private branch exchange comprising switching means switching, on the basis of messages sent by the terminal stations, between an ISDN standard message handling protocol for the ISDN supported terminal stations and a firm-owned message handling protocol for the incompletely ISDN supported terminal stations. In this manner the many non-ISDN supported features may be simply utilized, whilst there should be considered that ISDN supported services may often be rendered relatively simply, whereas additional, non-ISDN supported services often require high software development costs.

The invention is based on the recognition that in conventional, digital private branch exchanges there is a unique relation between B-channel and telephone number, whereas ISDN terminal stations are customarily connected to a passive bus with the common use of a B-channel. Partially adapting feature telephone sets to ISDN renders a simple hardware structure and suitable software structure possible.

An embodiment of a communication system according to the invention is characterized, in that communication between the incompletely ISDN supported terminal stations and the private branch exchange is effected via a standard ISDN layer-1 and to a standard ISDN address field via a layer-2, the switching means in the private branch exchange switching to the firm-owned message handling protocol on the basis of an ISDN Terminal Endpoint Identifier in the address field, the Terminal Endpoint Identifier having a predetermined value from a group of values in the incompletely ISDN supported terminal station. This achieves a physically equal handling of messages of ISDN supported and incompletely ISDN supported terminal stations, whereas the PABX is capable of supporting non-ISDN supported features when it employs firm-bound software. In the ISDN layer-2 message the so-termed control are distinguished, whereas the so-termed address field and the so-termed CRC (Cyclic Redundancy Check) are of equal structure. In the address field consisting of a so-termed SAPI field (Service Access Point Identifier) and the so-termed TEI field (Terminal Endpoint Identifier) as described in CCITT Recommendation I.440 concerning ISDN, the TEI is the distinguishing field. Depending on the fact whether one or two incompletely ISDN supported terminal stations are connected to the passive bus, one or two TEIs from a group of 0–63 is used for the distinguishing TEIs, because ISDN dynamically assigns higher TEI numbers to ISDN supported terminal stations. For the two feature telephone sets the TEI=0 and TEI=1, for example, are used, so that other fixed TEIs from 2–63 may be used for other purposes.

A further embodiment of a communication system according to the invention is characterized, in that two incompletely ISDN supported terminal stations, or one incompletely ISDN supported terminal station and a maximum of seven ISDN supported terminal stations, or eight ISDN supported terminal stations, can be connected to the passive bus. As a result, a fixed B-channel is used for an incompletely ISDN supported terminal station and a variable B-channel for an ISDN supported terminal station, whereas in conformity with CCITT Recommendations a maximum of eight terminal stations are connected to the passive bus.

BRIEF DESCRIPTION OF THE DRAWINGS

The invention will be further explained with reference to a drawing, in which.

DETAILED DESCRIPTION OF THE PREFERRED EMBODIMENTS

Figure 1:
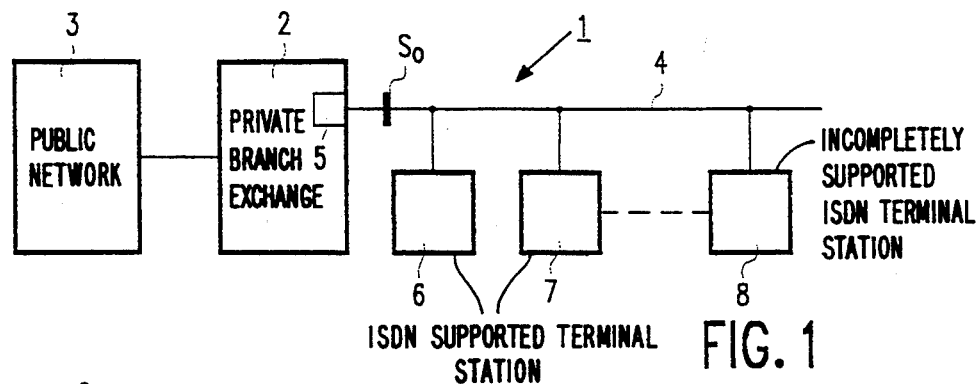
FIG. 1 shows in a diagram a communication system according to the invention.

FIG. 1 shows in a diagram a communication system 1 according to the invention, operating on the basis of an Integrated Services Digital Network ISDN. The communication system 1 comprises a private branch exchange 2, a PABX (Private Automatic Branch Exchange), coupled to a public network 3. The public network 3 may be a customary public network, a PSTN (Public Switched Telephone Network) and/or an ISDN (Integrated Services Digital Network) comprising digital exchanges. The private branch exchange 2 is coupled to a passive bus 4 via a so-termed ISDN $S_0$ interface. In the case of the private branch exchange 2 being a conventional private branch exchange, the latter comprises an interface 5 for transforming a 4-wire full duplex link into a corresponding 2-wire link, the so-termed U interface. The private branch exchange 2 is capable of communicating on ISDN $S_0$ level with an ISDN supported terminal station 6, which communication is performed in an ISDN Basic Rate Access 2B+D multiplexed channel structure, by which channel combined speech and data communication may be effected in various manners. The transmission rate on $S_0$ level is 192 kbit/sec, 2×64 kbit/sec for the 2 B-channels, and 16 kbit/sec for the D-channel. The ISDN B-channels for which ISDN only provides ISDN layer-1 functions, i.e. transmission, activation and deactivation, supply, and on $S_0$ level provides solutions to bus conflicts in a multi-point connection, are intended for transport of speech data and further data, whereas the ISDN D-channel is initially intended for signalling. For the D-channel ISDN provides ISDN layer-1, layer-2 and layer-3 functions. Since a separate channel, the D-channel, is used for signalling in ISDN, it is not only possible for signalling to be effected during a communication connection between subscribers, but, in addition, control information may be exchanged between ISDN units not having a communication link. For further details relating to ISDN, reference be made to CCITT ISDN standards, Nos. I.412, I.420 for Basic Rate Access, I.430 for a layer-1 specification of Basic Rate Access, I.440, I.441 for layer-2 specification and I.450, I.451 for layer-3 specification. According to CCITT Recommendations a maximum of eight ISDN terminals may be connected to the passive bus 4, a maximum of two terminals being in a position to be active simultaneously, because there are two B-channels having Basic Rate Access. The $S_0$ bus may thus be considered a collective path which provides access to the public network 3 for all connected ISDN sets. For exchanging information with a specific ISDN supported terminal station in an unambiguous manner, an ISDN layer-2 frame comprises a so-termed Terminal Endpoint Identifier in a frame address field, which identifier is either set in a terminal station, or assigned by the exchange if a terminal station 6 connected to the $S_0$ bus 4 wishes to communicate for the first time. In the ISDN layer-2 protocol a Terminal Endpoint Identifier can be assigned or withdrawn and a scanning operation performed for Terminal Endpoint Identifiers. For further details reference be made to said handbook "Datenkommunikation" D. Conrads. A further ISDN supported terminal station 7, or also, in a manner to be described according to the invention, an incompletely ISDN supported terminal station 8 can be connected to the passive bus.

Figure 2:
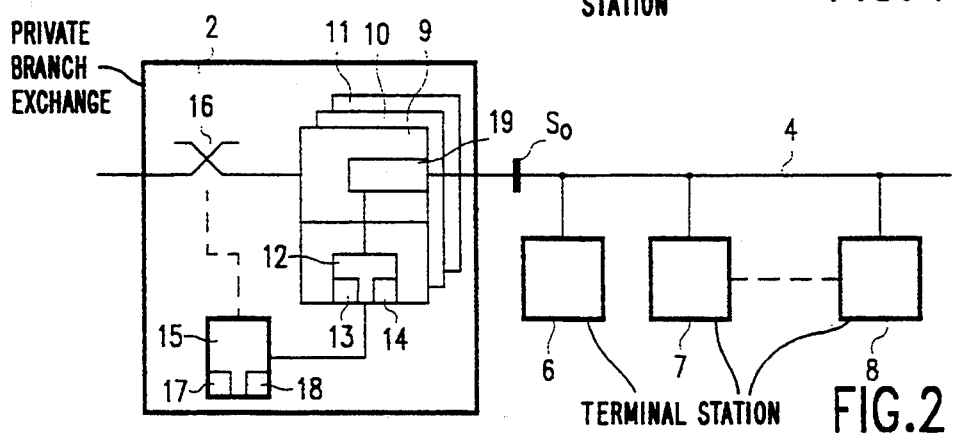
FIG. 2 shows a private branch exchange for a communication system according to the invention.

In FIG. 2, in which system elements corresponding to FIG. 1 are denoted by like references, a private branch exchange 2 for a communication system 1 according to the invention is shown to have a plurality of line cards 9, 10, 11 in which for line card 9 the $S_0$ interface is shown, coupled to the passive bus 4. The line cards 9, 10 and 11 comprise a processor 12 with a RAM memory 13 and a ROM memory 14. The ROM memory 14 may be PROM memory in which operating software for the line card 9 is stored, or also a Flash EPROM memory in which operating software for the line card 9 can be stored from a central processor 15 in the private branch exchange 2, which software also controls a switching circuit 16 in the private branch exchange 2. The central processor 15 is also coupled to a RAM memory 17 and a ROM memory 18 for operating software. The processor 12 is coupled to a message buffer 19 for buffering layer-1 messages coming from the terminal stations 6, 7 and 8 or intended for the terminal stations 6, 7 and 8, and may determine with the aid of the software on layer-2 level stored in the ROM memory 14 which Terminal Endpoint Identifier is situated in a layer-2 address field. According to the invention the processor 12 determines on the basis hereof whether a standard ISDN layer-2 protocol available in the ROM memory 14 is to be handled, or a layer-2 protocol for an incompletely ISDN supported terminal station 8 which supports a large number of non-ISDN supported features which are expensive in view of software development, such as informative message display, informative signalling by means of LED indicators etc. For a further description of such features, reference be made to said article in PTR, Vol. 48, No. 1, 1990. Also the layer-3 protocol is different for ISDN supported and incompletely ISDN supported terminal stations, that is to say, for the functions relating to the connection set-up. Message handling and terminal handling above layer-3, that is to say, message handling on application level, is also different in the way that for firm-owned terminal stations a handling deviating from the ISDN standard is used to support said firm-owned features. In addition to a firm-owned protocol being used for so-termed feature terminals, also a dedicated protocol may be used for relatively cheap stations. The invention therefore provides a message handling that depends on the environment, whereas still ISDN supported terminal stations and feature telephone sets or sets cheaper than ISDN supported telephone sets can be connected directly to the $S_0$ bus 4, i.e. the private branch exchange 2 notices which type of terminal station is connected and acts accordingly.

Figure 3A:
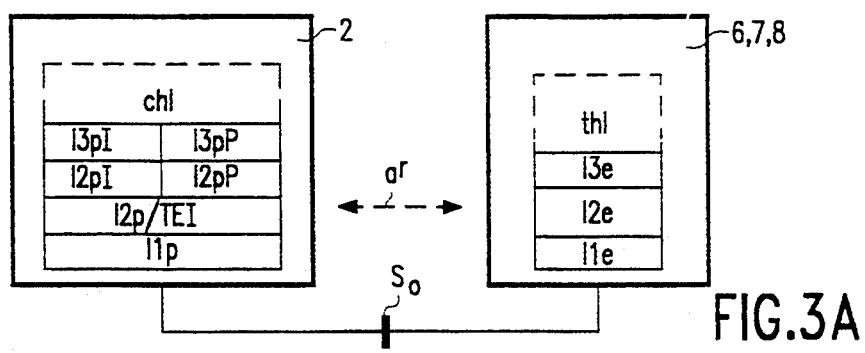
FIG. 3A shows communication between a private branch exchange and a terminal station in terms of an OSI layer model.

FIG. 3A shows communication between a private branch exchange 2 and a terminal station 6, 7 or 8 in terms of an OSI layer model (Open Systems Interconnection). Respective layers 1, 2 and 3 are shown in the private branch exchange 11p, 12p as common layers for ISDN supported terminal stations and incompletely ISDN supported terminal stations, 12pI and 13pI for ISDN supported terminal stations, and 12pP and 13pP for firm-owned terminal stations, and in the terminal stations 6, 7 or 8 the layers 11e, 12e and 13e. A protocol between so-termed peer entities as described, for example, in ISDN I.440 is symbolically shown by way of a dotted line arrow ar. By way of a dotted line over the layers 1, 2 and 3, call handling ch1 and terminal handling th1 is shown in the private branch exchange 2 and the terminal stations 6, 7 and 8 respectively. According to the invention the line cards 9, 10 and 11 automatically switch to the relevant protocol in the common layer 1pI, 1p2, on the basis of the Terminal Endpoint Identifier TEI in a message in the message buffer 19.

Figure 3B:
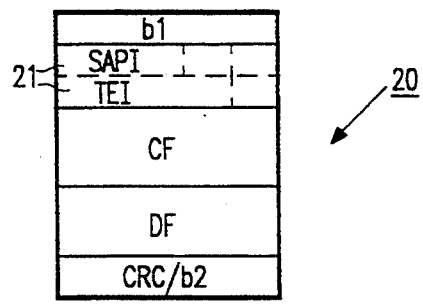
FIG. 3B shows a structure of a layer-2 message.

FIG. 3B shows a structure of a layer-2 message, which comprises an address field 21 with a SAPI (Service Access Point Identifier) and a TEI (Terminal Endpoint Identifier), which is shared by ISDN supported and incompletely ISDN supported terminal stations. Furthermore, block checks such as CRC b1 and b2 are equal. The fields intended for control purposes, a control field CF and a data field DF, however, are different for ISDN supported and incompletely ISDN supported terminal stations, as has been described. The control data field DF need not always be present. It should further be observed that in private branch exchanges there is often a fixed relation between B-channel and directory number. In that case either two incompletely ISDN supported terminal stations, or one incompletely ISDN supported terminal station plus a maximum of seven ISDN supported terminal stations, thus eight ISDN supported terminal stations in all, may be coupled per $S_0$ bus. The TEI values for incompletely ISDN supported terminal stations 8 may have a value from a group of 0–63, for example TEI=0 and TEI=1.

What is claimed is:

1. An integrated services digital network (ISDN) communication system comprising:
    a private branch exchange;
    a public network coupled to the private branch exchange;
    an ISDN supported terminal station coupled via a bus to the private branch exchange for communicating with the public network via the private branch exchange; and
    an incompletely ISDN supported terminal station coupled via the bus to the private branch exchange for communicating with the public network via the private branch exchange;
    said private branch exchange including switching means for switching between an ISDN standard message handling protocol for the ISDN supported terminal station and a firm-owned message handling protocol for the incompletely ISDN supported terminal station.

2. The communication system as claimed in claim 1, wherein communication between the incompletely ISDN supported terminal station and the private branch exchange is effected via a standard ISDN layer-1 protocol and a layer-2 protocol having a standard ISDN address field and wherein the switching means switches to the firm-owned message handling protocol in response to an ISDN terminal endpoint identifier segment of the standard ISDN address field having a value which is equal to a value in the incompletely ISDN supported terminal station.

3. The communication system as claimed in claim 1, further including additional ISDN supported terminal stations so that the maximum number of ISDN supported terminal stations is no more than eight.

4. A private branch exchange included in a communication system based on an integrated services digital network (ISDN) coupled to an ISDN supported terminal station and an incompletely ISDN supported terminal station via a bus for communication with a public network, said private branch exchange comprising:
    standard messaging means for communicating with the ISDN supported terminal station via an ISDN standard message handling protocol;
    further messaging means for communicating with the incompletely supported ISDN terminal station;
    a memory including a standard layer-2 protocol address field; and
    switching means, responsive to a value of standard layer-2 protocol address field, for switching between said standard messaging means and said further messaging means.

* * * * *